(12) United States Patent
Suzuki

(10) Patent No.: US 9,488,800 B2
(45) Date of Patent: Nov. 8, 2016

(54) WIDE ANGLE LENS AND IMAGING APPARATUS

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 53 days.

(21) Appl. No.: 14/645,764

(22) Filed: Mar. 12, 2015

(65) Prior Publication Data

US 2015/0185437 A1 Jul. 2, 2015

Related U.S. Application Data

(63) Continuation of application No. PCT/JP2013/005292, filed on Sep. 6, 2013.

(30) Foreign Application Priority Data

Sep. 14, 2012 (JP) ................... 2012-202227

(51) Int. Cl.
*G02B 9/00* (2006.01)
*G02B 9/64* (2006.01)
*G02B 13/04* (2006.01)
*G02B 27/00* (2006.01)

(52) U.S. Cl.
CPC ............ *G02B 9/64* (2013.01); *G02B 13/04* (2013.01); *G02B 27/0062* (2013.01)

(58) Field of Classification Search
CPC ........................................ G02B 9/64
USPC ........................................ 359/754
See application file for complete search history.

(56) References Cited

U.S. PATENT DOCUMENTS

| 8,693,110 B2* | 4/2014 | Kuzuhara .............. G02B 15/14 348/208.4 |
| 2004/0136095 A1 | 7/2004 | Suzuki |
| 2008/0252996 A1 | 10/2008 | Kato |
| 2010/0238561 A1 | 9/2010 | Nakagawa et al. |
| 2010/0321791 A1 | 12/2010 | Hayakawa |
| 2011/0128633 A1 | 6/2011 | Toyama |

FOREIGN PATENT DOCUMENTS

| JP | 2004-219610 | 8/2004 |
| JP | 2007-072117 | 3/2007 |
| JP | 2008-261969 | 10/2008 |
| JP | 2009-282214 | 12/2009 |
| JP | 2010-197481 | 9/2010 |
| JP | 2011112909 | 6/2011 |

OTHER PUBLICATIONS

International Search Report, PCT/JP2013/005292, Jan. 21, 2014.
Chinese Official Action—201380047355.X—May 20, 2016.

* cited by examiner

*Primary Examiner* — James Jones
(74) *Attorney, Agent, or Firm* — Young & Thompson

(57) ABSTRACT

A wide angle lens consists of a front group, a stop, and a positive rear group in order from the object side. A positive lens with a convex surface on the object side and a lens having a negative meniscus shape with a convex surface on the object side are respectively disposed first and second from the object side in the front group. When Abbe number with respect to the d-line and the partial dispersion ratio between the g-line and the F-line of the lens having a negative meniscus shape are taken as vdf and θgFf respectively, the wide angle lens satisfies a conditional expression (1): $0.038 < \theta gFf - 0.6415 + 0.001618 \times vdf$ and a conditional expression (2): $vdf < 19$.

11 Claims, 4 Drawing Sheets

EXAMPLE 1

EXAMPLE 1

EXAMPLE 2

EXAMPLE 3

EXAMPLE 1

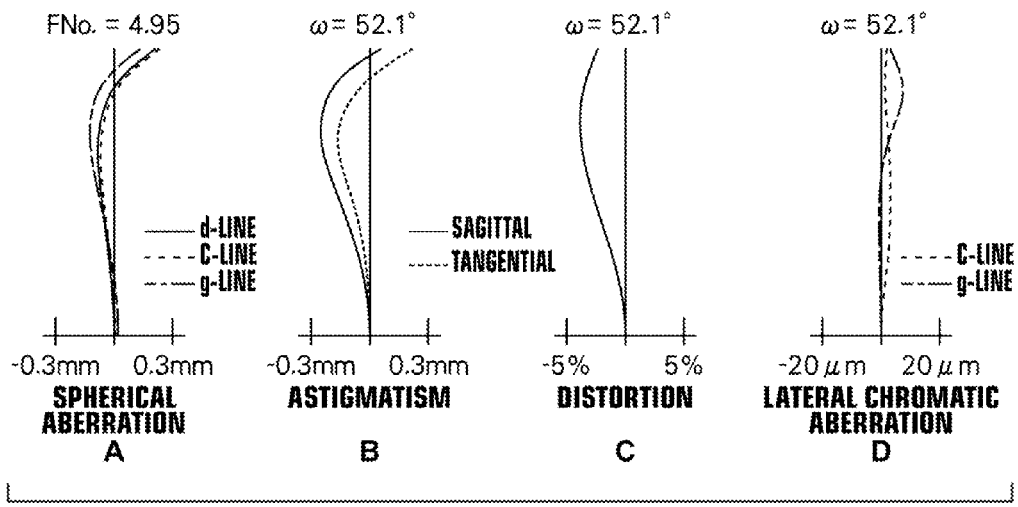
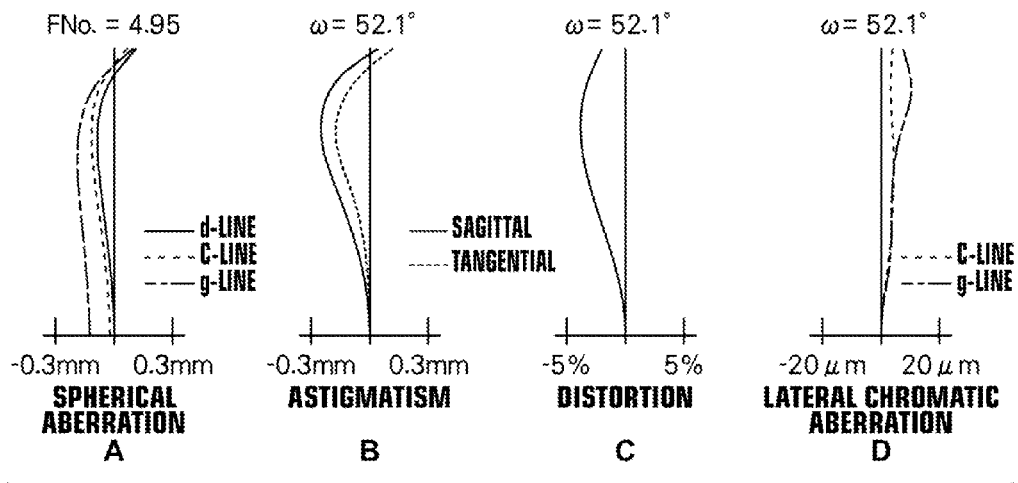

WIDE ANGLE LENS AND IMAGING APPARATUS

CROSS-REFERENCE TO RELATED APPLICATIONS

This application is a Continuation of PCT International Application No. PCT/JP2013/005292 filed on Sep. 6, 2013, which claims priority under 35 U.S.C. §119 (a) to Japanese Patent Application No. 2012-202227 filed on Sep. 14, 2012. The above application is hereby expressly incorporated by reference, in its entirety, into the present application.

TECHNICAL FIELD

The present invention relates to a wide angle lens and an imaging apparatus, and more specifically to a wide angle lens suitable for use with digital cameras and the like, and an imaging apparatus equipped with the wide angle lens.

BACKGROUND ART

Heretofore, in wide angle lenses for use with single-lens reflex cameras, a retrofocus type lens system in which a negative lens group and a positive lens group are disposed in order from the object side and is asymmetric with respect to the stop has been heavily used because a sufficient back focus needs to be ensured. As such a retrofocus type lens system, the lens system described, for example, in Japanese Unexamined Patent Publication No. 2004-219610 is known.

SUMMARY OF INVENTION

Technical Problem

Although, the retrofocus type lens system is suitable for ensuring the back focus, it causes difficulty in correcting aberrations related to the angle of view; in particular, satisfactory correction of lateral chromatic aberration is difficult, as it has an asymmetric structure with respect to the stop as described above. The lens system described in Japanese Unexamined Patent Publication No. 2004-219610 has relatively well corrected lateral chromatic aberration, but more satisfactorily corrected lateral chromatic aberration may sometimes be required when installing a digital back in place of film or the like, and the level of such requirements has recently been further raised.

The present invention has been developed in view of the circumstances described above, and it is an object of the present invention to provide a wide angle lens having excellent optical performance with well corrected lateral chromatic aberration, and an imaging apparatus equipped with the wide angle lens.

Solution to Problem

A wide angle lens of the present invention consists essentially of a front group, a stop, and a rear group having a positive refractive power, in order from the object side, in which a positive lens with a convex surface on the object side is disposed on the most object side in the front group, a negative meniscus lens with a convex surface on the object side is disposed second from the object side in the front group, and the wide angle lens satisfies conditional expressions (1) and (2) given below:

$$0.038 < \theta gFf - 0.6415 + 0.001618 \times vdf \quad (1)$$

$$vdf < 19 \quad (2)$$

where
$\theta gFf$: partial dispersion ratio of the negative meniscus lens between the g-line and the F-line, and
$vdf$: Abbe number of the negative meniscus lens with respect to the d-line.

Preferably, in the wide angle lens of the present invention, the rear group includes one positive lens having a biconvex shape and the wide angle lens satisfies conditional expressions (3) and (4) given below:

$$0.020 < \theta gFr - 0.6415 + 0.001618 \times vdr \quad (3)$$

$$vdr > 75 \quad (4)$$

where
$\theta gFr$: partial dispersion ratio of the positive lens having a biconvex shape between the g-line and the F-line, and
$vdr$: Abbe number of the positive lens having a biconvex shape with respect to the d-line.

Preferably, in the wide angle lens of the present invention, the front group includes a cemented lens and, of the cemented lens included in the front group, a cemented lens located closest to the stop includes a first positive lens having a positive refractive power and a second negative lens having a negative refractive power, and the wide angle lens satisfies conditional expressions (5) and (6) given below:

$$0.02 < Ndp - Ndn < 0.25 \quad (5)$$

$$0.2 < vdp - vdn < 5 \quad (6)$$

where
$Ndp$: refractive index of the first positive lens with respect to the d-line,
$Ndn$: refractive index of the second negative lens with respect to the d-line,
$vdp$: Abbe number of the first positive lens with respect to the d-line, and
$vdn$: Abbe number of the second negative lens with respect to the d-line.

The wide angle lens of the present invention preferably satisfies a conditional expression (5') given below and more preferably satisfies a conditional expression (5") given below, instead of the conditional expression (5):

$$0.03 < Ndp - Ndn < 0.12 \quad (5')$$

$$0.03 < Ndp - Ndn < 0.07 \quad (5'').$$

The wide angle lens of the present invention preferably satisfies a conditional expression (6') given below and more preferably satisfies a conditional expression (6") given below, instead of the conditional expression (6):

$$0.7 < vdp - vdn < 2.5 \quad (6')$$

$$0.7 < vdp - vdn < 1.5 \quad (6'').$$

Preferably, in the wide angle lens of the present invention, the front group includes a cemented lens and, of the cemented lens included in the front group, a cemented lens located closest to the stop includes a first positive lens having a positive refractive power and a second negative lens having a negative refractive power, and the wide angle lens satisfies a conditional expression (7) given below:

$$vdp < 33 \quad (7)$$

where
$vdp$: Abbe number of the first positive lens with respect to the d-line.

The wide angle lens of the present invention preferably satisfies a conditional expression (7') given below and more preferably satisfies a conditional expression (7") given below, instead of the conditional expression (7):

$$\nu dp<30 \quad (7')$$

$$\nu dp<27 \quad (7").$$

Preferably, in the wide angle lens of the present invention, the front group includes a cemented lens and, of the cemented lens included in the front group, a cemented lens located closest to the stop has a configuration in which a positive lens and a negative lens are cemented in this order from the object side.

Preferably, in the wide angle lens of the present invention, the front group includes a cemented lens and, of the cemented lens included in the front group, a cemented lens located closest to the stop has a configuration in which a positive lens and a negative lens are cemented and the cemented surface of the positive lens and the negative lens has a concave shape on the object side.

The wide angle lens of the present invention preferably has a total angle of view of 80 degrees or more.

An imaging apparatus of the present invention is equipped with the wide angle lens of the present invention.

The foregoing "essentially" in the context of "consists essentially of" intends that the wide angle lens may include a lens having substantially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above.

The partial dispersion ratio θgFf of a lens between the g-line and the F-line is defined, when the refractive indices of the lens with respect to the g-line, the F-line, and the C-line are taken as Ng, NF, and NC respectively, as θgFf=(Ng−Nf)/(NF−NC).

The signs of refractive powers of the lenses and the lens groups, and surface shapes of the lenses of the wide angel lens of the present invention are considered in the paraxial region for those having an aspherical surface.

Advantageous Effects of Invention

According to the present invention, the configuration of the first and the second lenses from the object side in the front group are set appropriately, in particular, the material of the second lens from the object side in the front group is set appropriately. This allows a wide angle lens having high optical performance with well corrected lateral chromatic aberration, while ensuring a wide angle of view, and an imaging apparatus equipped with the wide angle lens may be provided.

Figure 4:
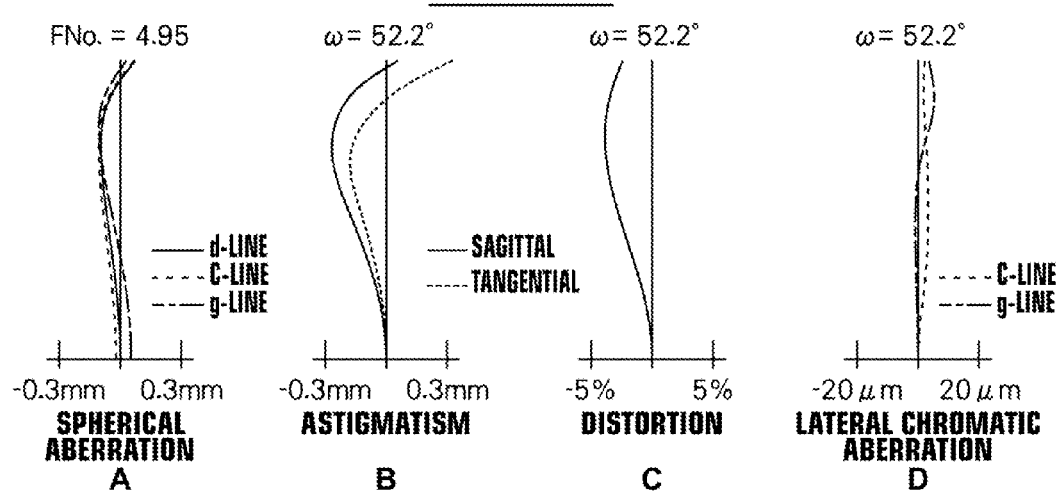

A to D of FIG. 4 illustrate each aberration diagram of the wide angle lens of Example 1.

A to D of FIG. 5 illustrate each aberration diagram of the wide angle lens of Example 2.

A to D of FIG. 6 illustrate each aberration diagram of the wide angle lens of Example 3.

Figure 7:
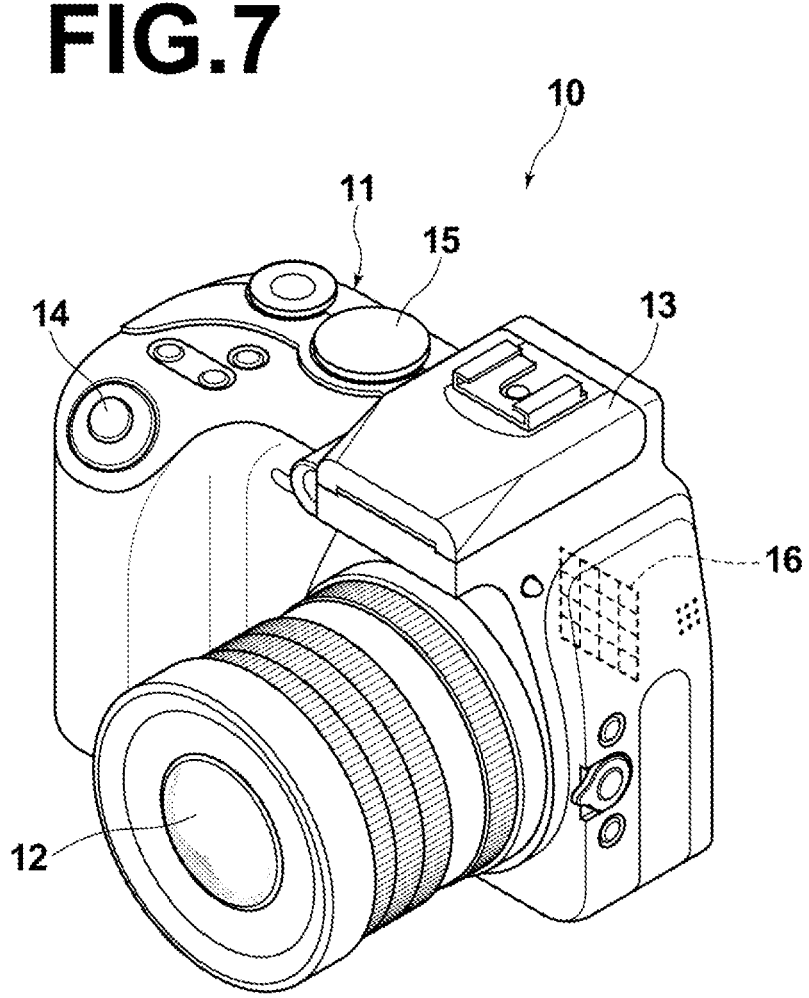

FIG. 7 is a perspective view of an imaging apparatus according to an embodiment of the present invention, illustrating the configuration thereof.

DESCRIPTION OF EMBODIMENTS

Figure 1:
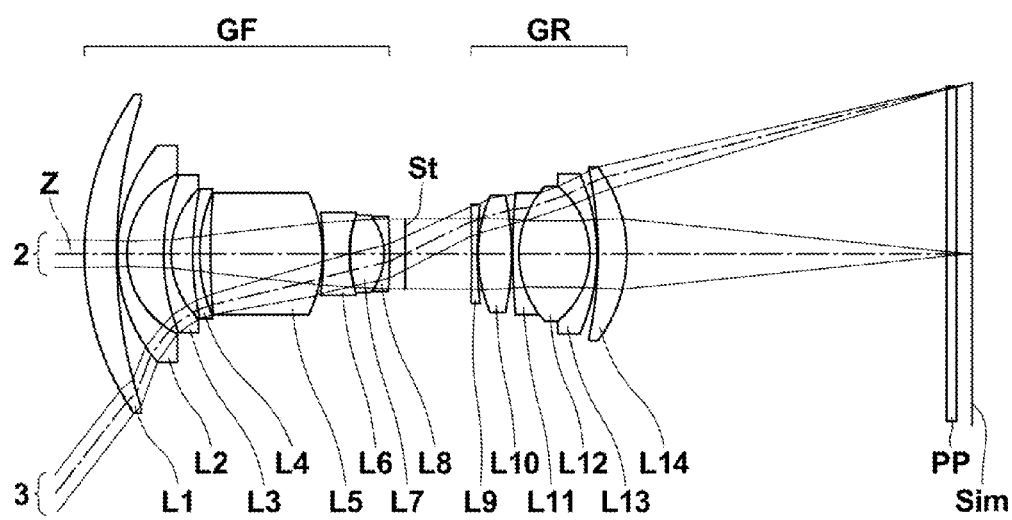
FIG. 1 is a cross-sectional view of a wide angle lens of Example 1 of the present invention, illustrating the configuration thereof.
Figure 2:
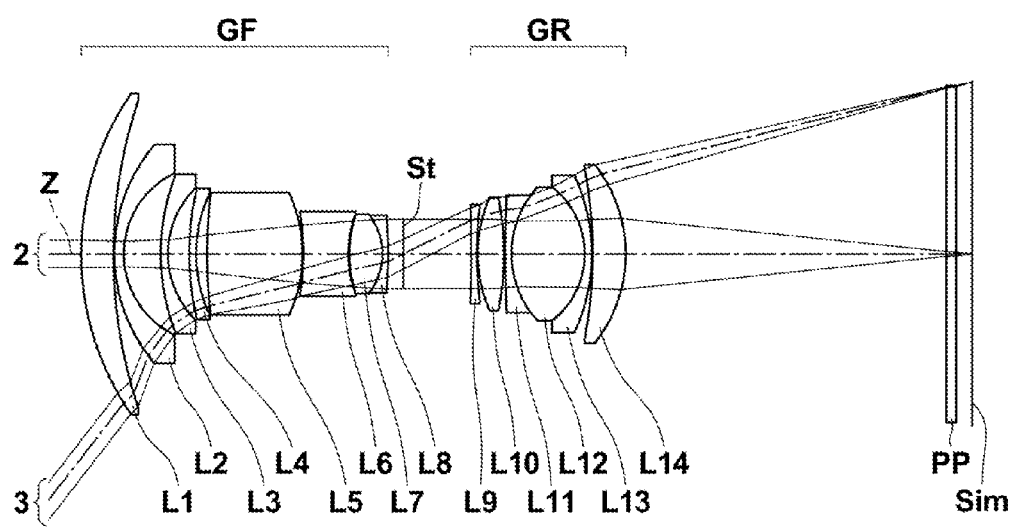
FIG. 2 is a cross-sectional view of a wide angle lens of Example 2 of the present invention, illustrating the configuration thereof.
Figure 3:
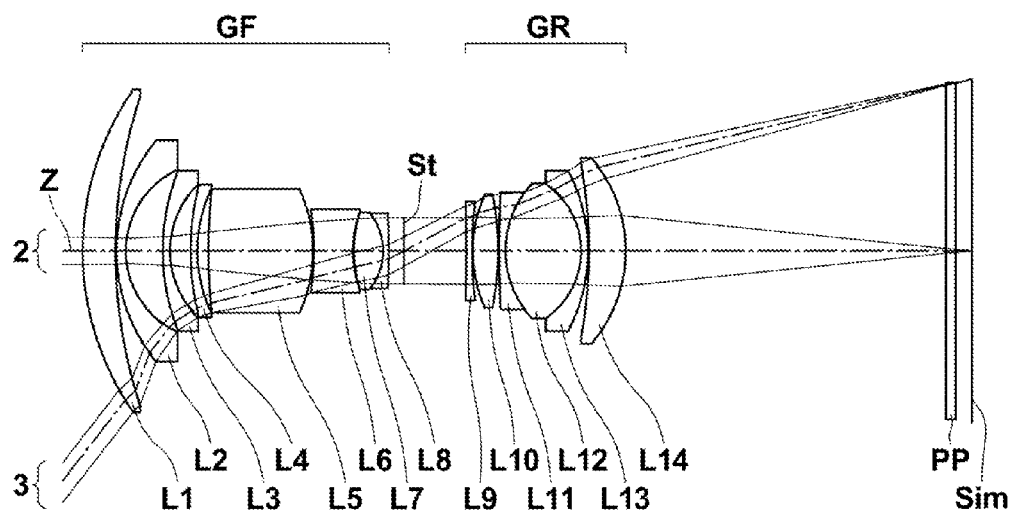
FIG. 3 is a cross-sectional view of a wide angle lens of Example 3 of the present invention, illustrating the configuration thereof.

Hereinafter, embodiments of the present invention will be described in detail with reference to the accompanying drawings. FIGS. 1 to 3 are cross-sectional views of wide angle lenses according to embodiments of the present invention, illustrating configurations thereof and each corresponding to each of Examples 1 to 3 to be described later. In FIGS. 1 to 3, the left side is the object side and the right side is the image side, and an axial light beam 2 and a maximum image height light beam 3 from an object at infinity are also illustrated. As the basic configurations and illustration methods of the examples shown in FIGS. 1 to 3 are identical, a description will be made, hereinafter, with reference mainly to the example illustrated in FIG. 1, as a representative.

The wide angle lens according to an embodiment of the present invention consists essentially of a front group GF, an aperture stop St, and a rear group GR having a positive refractive power. Note that the aperture stop St shown in FIGS. 1 to 3 does not necessarily indicate the size or shape but the position on the optical axis Z.

As it is conceivable that, when the wide angle lens is installed in an imaging apparatus, a cover glass for protecting the image sensor, a various types of filters, such as a low-pass filter, an infrared cut filter, and the like are provided according to the specifications of the imaging apparatus, FIG. 1 illustrates an example in which a parallel plate optical member PP assuming these is disposed between the most image side lens surface and the image plane Sim. But the position of the optical member PP is not limited to that shown in FIG. 1 and a configuration without the optical member PP is also possible.

The lens configuration of each lens group of the example shown in FIG. 1 is as follows. That is, the front group GF is composed of a lens L1 which is a positive meniscus lens with a convex surface on the object side, lenses L2, L3, and L4 which are three negative meniscus lenses with convex surfaces on the object side, a positive lens L5, a negative lens L6, a lens L7 which is a biconvex lens, and a lens L8 which is a negative meniscus lens with a concave surface on the object side, in order from the object side. The rear group GR is composed of a negative lens L9, a lens L10 which is a biconvex lens, a lens L11 which is a negative meniscus lens with a convex surface on the object side, a lens L12 which is a biconvex lens, a lens L13 which is a negative meniscus lens with a convex surface on the image side, and a lens L14 which is a positive meniscus lens with a convex surface on the image side, in order from the object side. The lenses L7 and L8 are cemented to form a cemented lens. The lenses L11, L12, and L13 are cemented to form a three element cemented lens. The other lenses are uncemented single lenses. All lenses are spherical lenses.

The wide angle lens of the present embodiment is configured such that the lenses L1 and L2 disposed first and second from the object side in the front group GF are a positive lens with a convex surface on the object side and a negative meniscus lens with a convex surface on the object side. Such a combination of the first and the second lenses from the object side in the entire system allows distortion to be corrected satisfactorily while reducing the diameter of the lens disposed on the most object side in the entire system.

Further, the wide angle lens of the present embodiment is configured so as to satisfy conditional expressions (1) and (2) given below with respect to the lens L2 disposed second from the object side in the front group G2:

$$0.038 < \theta gFf - 0.6415 + 0.001618 \times vdf \quad (1)$$

$$vdf < 19 \quad (2)$$

where

θgFf: partial dispersion ratio of the lens located second from the object side in the front group between the g-line and the F-line, and vdf: Abbe number of the lens located second from the object side in the front group with respect to the d-line.

Satisfaction of the conditional expression (1) allows satisfactory correction of higher order chromatic aberrations to be made easily. Satisfaction of the conditional expression (2) allows satisfactory correction of lateral chromatic aberration to be made easily. Simultaneous satisfaction of the conditional expressions (1) and (2) allows the correction of lateral chromatic aberration, mainly the correction of secondary spectrum of chromatic aberration, to be made easily. If either one of the conditional expressions (1) and (2) is not satisfied, the g-line tends to be over in lateral chromatic aberration.

Further, the wide angle lens of the present embodiment preferably includes one positive lens having a biconcave shape in the rear group GR and satisfies conditional expressions (3) and (4) given below with respect to the one positive lens having a biconcave shape. If the rear group GR includes two or more positive lenses having a biconcave shape, the following conditional expressions (3) and (4) are considered with respect to the same lens.

$$0.020 < \theta gFr - 0.6415 + 0.001618 \times vdr \quad (3)$$

$$vdr > 75 \quad (4)$$

where

θgFr: partial dispersion ratio of the positive lens having a biconvex shape, included in the rear group, between the g-line and the F-line, and vdr: Abbe number of the positive lens having a biconvex shape, included in the rear group, with respect to the d-line.

Simultaneous satisfaction of the conditional expressions (3) and (4) allows the correction of lateral chromatic aberration, mainly the correction of secondary spectrum of chromatic aberration, to be made easily. If either one of the conditional expressions (3) and (4) is not satisfied, the g-line tends to be over in lateral chromatic aberration.

For example, a cemented lens which includes a biconvex lens and a negative lens may be disposed in the rear group GR and the biconvex lens included in the cemented lens may be formed to satisfy the conditional expressions (3) and (4). Such arrangement allows the correction of the secondary spectrum of lateral chromatic aberration to be made more easily. In this case, for more satisfactory correction of lateral chromatic aberration, the cemented lens which includes the biconvex lens that satisfies the conditional expressions (3) and (4) is preferably a three element cemented lens and the three element cemented lens is more preferably composed of a negative lens, the biconvex lens, and a negative lens cemented together.

The wide angle lens of the present embodiment preferably includes a cemented lens in the front group GF and, of the cemented lens included in the front group GF, a cemented lens located closest to the aperture stop St preferably includes one positive lens and one negative lens. For example, in the example shown in FIG. 1, the cemented lens located closest to the aperture stop St in the front group GF is the cemented lens in which the positive lens L7 and the negative lens L8 are cemented.

Then, when the one positive lens and the one negative lens included in the cemented lens located closest to the aperture stop in the front group GF are taken as first positive lens and second negative lens, conditional expressions (5) and (6) given blow are preferably satisfied with respect to these. If the cemented lens located closest to the aperture stop St in the front Group GF includes two or more positive lenses, the following conditional expressions (5) and (6) are considered with respect to the same positive lens. Likewise, if the foregoing cemented lens includes two or more negative lenses, the following conditional expressions (5) and (6) are considered with respect to the same negative lens.

$$0.02 < Ndp - Ndn < 0.25 \quad (5)$$

$$0.2 < vdp - vdn < 5 \quad (6)$$

where

Ndp: refractive index of the first positive lens with respect to the d-line,

Ndn: refractive index of the second negative lens with respect to the d-line, vdp: Abbe number of the first positive lens with respect to the d-line, and vdn: Abbe number of the second negative lens with respect to the d-line.

Satisfaction of the conditional expressions (5) and (6) allows spherical aberration and field curvature to be corrected satisfactorily with respect to each color. If either one of the lower limits of the conditional expressions (5) and (6) is not satisfied, the chromatic aberration correction effect of the cemented surface of the cemented lens is reduced, whereby spherical aberration with respect to each color is not aligned and the field curvature of the g-line tends to be under. If either one of the upper limits of the conditional expressions (5) and (6) is not satisfied, the amount of aberrations generated at the cemented surface of the foregoing cemented lens is increased and the refractive power of the cemented surface needs to be reduced for suppressing the aberrations. Then, the chromatic aberration correction effect of the cemented surface of the cemented lens is reduced, whereby spherical aberration with respect to each color is not aligned and the field curvature of the g-line tends to be under.

Further, with respect to the foregoing vdp, the wide angle lens of the present embodiment preferably satisfies a conditional expression (7) given below:

$$vdp < 33 \quad (7)$$

Satisfaction of the conditional expression (7) allows a well-balanced correction of both longitudinal chromatic aberration and lateral chromatic aberration to be made easily. In a case in which the conditional expression (7) is not satisfied, an attempt to satisfactorily correct longitudinal chromatic aberration will result in that the g-line tends to be over in lateral chromatic aberration and the well-balanced correction of both longitudinal chromatic aberration and lateral chromatic aberration is difficult.

Simultaneous satisfaction of the conditional expressions (5), (6), and (7) allows spherical aberration and field curvature to be corrected more satisfactorily with respect to each color.

For more satisfactory aberration correction, the wide angle lens of the present embodiment preferably satisfies a conditional expression (5') given below and more preferably satisfies a conditional expression (5") given below, instead of the conditional expression (5):

$$0.03 < Ndp - Ndn < 0.12 \quad (5')$$

$$0.03 < Ndp - Ndn < 0.07 \quad (5'').$$

For more satisfactory aberration correction, the wide angle lens of the present embodiment preferably satisfies a conditional expression (6') given below and more preferably satisfies a conditional expression (6") given below, instead of the conditional expression (6):

$$0.7 < \nu dp - \nu dn < 2.5 \quad (6')$$

$$0.7 < \nu dp - \nu dn < 1.5 \quad (6'').$$

For more satisfactory aberration correction, the wide angle lens of the present embodiment preferably satisfies a conditional expression (7') given below and more preferably satisfies a conditional expression (7") given below, instead of the conditional expression (7):

$$\nu dp < 30 \quad (7')$$

$$\nu dp < 27 \quad (7'').$$

In the wide angle lens of the present embodiment, of the cemented lens included in the front group GF, a cemented lens located closest to the aperture stop St preferably has a configuration in which a positive lens and a negative lens are cemented in this order from the object side. Such configuration allows satisfactory correction of field curvature with respect to each color, in particular, the correction of field curvature of the g-line. This has no relation to the number of lenses constituting the cemented lens. In the example shown in FIG. 1, the cemented lens in the front group GF is composed of two lenses, the positive lens L7 and the negative lens L8. But, even if a three element configuration is implemented, in which the negative lens L6, the positive lens L7, and the negative lens L8 are cemented, the aforementioned advantageous effect of satisfactory correction of field curvature with respect to each color, in particular, the correction of field curvature of the g-line may be obtained.

In the case in which, of the cemented lens included in the front group GF, the cemented lens located closest to the aperture stop St has a configuration in which a positive lens and a negative lens are cemented, the cemented surface between the positive lens and the negative lens preferably has a concave shape on the object side. Formation of the cemented surface in a concave shape on the object side allows the correction of field curvature with respect to each color, in particular, the correction of field curvature of the g-line to be made more satisfactorily.

The wide angle lens of the present embodiment preferably has a total angle of view of 80 degrees or more for realizing an increased angle of view.

The foregoing preferable configurations may be combined in any manner and are preferably employed selectively, as appropriate, according to the specifications required of the wide angle lens. Appropriate employment of the preferable configurations allows an optical system having more favorable optical performance or an optical system that complies with higher specifications to be realized. The wide angle lens of the present embodiment is suitably applicable, for example, to an optical system that has a total angle of view of about 80 degrees or more and an F-number of about 4.8, and requires satisfactory correction of lateral chromatic aberration.

Next, numerical examples of the wide angle lens of the present invention will be described.

Example 1

The lens cross-section view of the wide angle lens of Example 1 is as illustrated in FIG. 1. As the illustration method is as described above, duplicated description will be omitted here.

The schematic configuration of the wide angle lens of Example 1 is as follows. That is, the wide angle lens consists of a front group GF, an aperture stop St, and a rear group GR having a positive refractive power, in order from the object side. The front group OF is composed of a lens L1 having a positive meniscus shape with a convex surface on the object side, a lens L2 having a negative meniscus shape with a convex surface on the object side, a lens L3 having a negative meniscus shape with a convex surface on the object side, a lens L4 having a negative meniscus shape with a convex surface on the object side, a lens L5 having a biconvex shape, a lens L6 having a biconcave shape, a lens L7 having a biconvex shape, and a lens L8 having a negative meniscus shape with a concave shape on the object side, in order from the object side. The rear group GR is composed of a lens L9 having a biconcave shape, a lens L10 having a biconvex shape, a lens L11 having a negative meniscus shape with a convex surface on the object side, a lens L12 having a biconvex shape, a lens L13 having a negative meniscus shape with a convex surface on the image side, and a lens L14 having a positive meniscus shape with a convex surface on the image side, in order from the object side. The lens L7 and the lens L8 are cemented. The lens L11, the lens L12, and the lens L13 are cemented to form a three element cemented lens. The other lenses are uncemented single lenses. All lenses are spherical lenses.

Table 1 shows the lens data of the wide angle lens of Example 1 and Table 2 shows the values of the wide angle lens of Example 1 corresponding to the conditional expressions (1) to (7).

The symbols f, BF, 2ω, FNo., and Y in the upper margin of Table 1 represent the focal length of the entire system, the back focus (in terms of air equivalent distance), the total angle of view, F-number, and the maximum image height respectively, all of which are with respect to the d-line.

The Si column within the frame of Table 1 indicates the $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of the $i^{th}$ surface. The Di column indicates the surface distance on the optical axis Z between the $i^{th}$ surface and the $(i+1)^{th}$ surface. The sign of the radius of curvature is positive if the surface shape is convex on the object side and negative if it is convex on the image side.

The Ndj column in Table 1 indicates the refractive index of the $j^{th}$ optical element with respect to the d-line (wavelength 587.56 nm) in which a number j (j=1, 2, 3, - - - ) is given to each constituent element in a serially increasing manner toward the image side with the most object side constituent element being taken as the first element, and the νdj column indicates the Abbe number of the $j^{th}$ optical element with respect to the d-line. The θgFj column indicates the partial dispersion ratio of the $j^{th}$ optical element between the g-line and the F-line. Note that the θgFj column shows values only for the lenses related to the present invention, that is, for the second lens from the object side and one biconvex lens included in the rear group GR. Also note that the aperture stop St and the optical member PP are included in Table 1, and the surface number column corresponding to the aperture stop St includes the word "(St)" in addition to the surface number.

In each table shown below, "degree" is used as the unit of angle, and "mm" is used as the unit of length. But, other appropriate units may also be used, as optical systems can be used by proportionally enlarged or reduced. Further, each table shown below indicates values rounded to a predetermined digit.

TABLE 1

Example 1
f = 24.26, BF = 61.05, 2ω = 104.3, FNo. = 4.95, Y = 30.5

| Si | Ri | Di | Ndj | ν dj | θ gFj |
|---|---|---|---|---|---|
| 1 | 50.008 | 5.75 | 1.77250 | 49.6 | |
| 2 | 87.200 | 0.16 | | | |
| 3 | 29.865 | 1.68 | 1.95906 | 17.5 | 0.6598 |
| 4 | 15.831 | 6.55 | | | |
| 5 | 38.477 | 1.30 | 1.88300 | 40.8 | |
| 6 | 16.232 | 3.88 | | | |
| 7 | 53.808 | 1.21 | 1.88300 | 40.8 | |
| 8 | 27.161 | 1.94 | | | |
| 9 | 133.930 | 19.98 | 1.51742 | 52.4 | |
| 10 | −25.333 | 0.16 | | | |
| 11 | −55.977 | 4.59 | 1.65160 | 58.5 | |
| 12 | 19.958 | 0.17 | | | |
| 13 | 22.480 | 6.07 | 1.84666 | 23.9 | |
| 14 | −11.127 | 1.01 | 1.80810 | 22.8 | |
| 15 | −84.935 | 2.71 | | | |
| 16(St) | ∞ | 11.86 | | | |
| 17 | −314.750 | 1.00 | 1.80400 | 46.6 | |
| 18 | 75.464 | 0.16 | | | |
| 19 | 26.324 | 5.98 | 1.54814 | 45.8 | |
| 20 | −49.905 | 0.20 | | | |
| 21 | 114.380 | 1.13 | 2.00069 | 25.5 | |
| 22 | 18.060 | 12.65 | 1.49700 | 81.6 | 0.5375 |
| 23 | −15.408 | 1.25 | 1.88300 | 40.8 | |
| 24 | −34.861 | 0.18 | | | |
| 25 | −71.558 | 5.16 | 1.61800 | 63.4 | |
| 26 | −25.648 | 57.00 | | | |
| 27 | ∞ | 1.74 | 1.51680 | 64.2 | |
| 28 | ∞ | | | | |

TABLE 2

Example 1

| | |
|---|---|
| Conditional Expression (1) | 0.047 |
| Conditional Expression (2) | 17.5 |
| Conditional Expression (3) | 0.028 |
| Conditional Expression (4) | 81.6 |
| Conditional Expression (5) | 0.03856 |
| Conditional Expression (6) | 1.10 |
| Conditional Expression (7) | 23.9 |

A to D of FIG. 4 show each aberration diagram of the wide angle lens of Example 1, illustrating spherical aberration, astigmatism, distortion, and lateral chromatic aberration respectively. The "FNo." in the spherical aberration diagram indicates the F-number, and "ω" in the other aberration diagrams indicates the half angle of view. Each aberration diagram illustrates aberration with the d-line (wavelength 587.56 nm) as the reference wavelength. But the spherical aberration diagram also indicates aberrations with respect to the C-line (wavelength 656.27 nm) and the g-line (wavelength 435.84 nm), and the lateral chromatic aberration diagram illustrates aberrations with respect to the C-line and the g-line. In the astigmatism diagram, astigmatism in the sagittal direction is indicated by the solid line and astigmatism in the tangential direction is indicated by the dotted line. A to D of FIG. 4 are those when the object distance is infinity.

The illustration method, and symbols in each table, their meanings, representation method, and the like described in Example 1 are applied also to the following examples unless otherwise specifically described, and duplicated description will be omitted herein below.

Example 2

The lens cross-sectional view of the wide angle lens of Example 2 is as illustrated in FIG. 2. The schematic configuration of the wide angle lens of Example 2 is identical to that of Example 1. Table 3 and Table 4 respectively show the lens data and the values corresponding to the conditional expressions (1) to (7) for the wide angle lens of Example 2. A to D of FIG. 5 show each aberration diagram of the wide angle lens of Example 2.

TABLE 3

Example 2
f = 24.28, BF = 61.04, 2ω = 104.3, FNo. = 4.95, Y = 30.5

| Si | Ri | Di | Ndj | ν dj | θ gFj |
|---|---|---|---|---|---|
| 1 | 50.000 | 5.73 | 1.77250 | 49.6 | |
| 2 | 86.528 | 0.16 | | | |
| 3 | 29.837 | 1.68 | 1.95906 | 17.5 | 0.6598 |
| 4 | 15.927 | 6.57 | | | |
| 5 | 38.462 | 1.30 | 1.88300 | 40.8 | |
| 6 | 16.395 | 3.78 | | | |
| 7 | 50.218 | 1.20 | 1.88300 | 40.8 | |
| 8 | 25.400 | 1.98 | | | |
| 9 | 100.000 | 16.95 | 1.54072 | 47.2 | |
| 10 | −25.612 | 0.16 | | | |
| 11 | −44.023 | 8.00 | 1.69680 | 55.5 | |
| 12 | 20.000 | 0.18 | | | |
| 13 | 22.765 | 5.89 | 1.90200 | 25.1 | |
| 14 | −11.294 | 1.01 | 1.84666 | 23.9 | |
| 15 | −68.841 | 2.71 | | | |
| 16(St) | ∞ | 12.04 | | | |
| 17 | −313.036 | 1.00 | 1.80400 | 46.6 | |
| 18 | 65.308 | 0.16 | | | |
| 19 | 25.177 | 4.67 | 1.58144 | 40.7 | |
| 20 | −50.559 | 0.20 | | | |
| 21 | 187.831 | 1.13 | 2.00069 | 25.5 | |
| 22 | 17.501 | 13.04 | 1.49700 | 81.6 | 0.5375 |
| 23 | −14.923 | 1.25 | 1.88300 | 40.8 | |
| 24 | −32.871 | 0.16 | | | |
| 25 | −80.603 | 5.88 | 1.61800 | 63.4 | |
| 26 | −25.374 | 57.00 | | | |
| 27 | ∞ | 1.74 | 1.51680 | 64.2 | |
| 28 | ∞ | | | | |

TABLE 4

Example 2

| | |
|---|---|
| Conditional Expression (1) | 0.047 |
| Conditional Expression (2) | 17.5 |
| Conditional Expression (3) | 0.028 |
| Conditional Expression (4) | 81.6 |
| Conditional Expression (5) | 0.05534 |
| Conditional Expression (6) | 1.20 |
| Conditional Expression (7) | 25.1 |

Example 3

The lens cross-sectional view of the wide angle lens of Example 3 is as illustrated in FIG. 3. The schematic configuration of the wide angle lens of Example 2 is identical to that of Example 1. Table 5 and Table 6 respectively show the lens data and the values corresponding to the conditional expressions (1) to (7) for the wide angle lens of Example 3. A to D of FIG. 6 show each aberration diagram of the wide angle lens of Example 3.

TABLE 5

Example 3
f = 24.28, BF = 60.98, 2ω = 104.1, FNo. = 4.95, Y = 30.5

| Si | Ri | Di | Ndj | νdj | θgFj |
|---|---|---|---|---|---|
| 1 | 50.000 | 5.85 | 1.77250 | 49.6 | |
| 2 | 87.985 | 0.16 | | | |
| 3 | 30.776 | 1.68 | 1.95906 | 17.5 | 0.6598 |
| 4 | 15.910 | 6.57 | | | |
| 5 | 38.462 | 1.30 | 1.88300 | 40.8 | |
| 6 | 16.532 | 3.66 | | | |
| 7 | 47.455 | 1.20 | 1.88300 | 40.8 | |
| 8 | 25.794 | 1.97 | | | |
| 9 | 100.003 | 18.61 | 1.60342 | 38.0 | |
| 10 | −26.507 | 0.16 | | | |
| 11 | −51.626 | 6.96 | 1.74950 | 35.3 | |
| 12 | 20.000 | 0.18 | | | |
| 13 | 23.064 | 5.20 | 2.00272 | 19.3 | |
| 14 | −10.819 | 1.00 | 1.94595 | 18.0 | |
| 15 | −131.867 | 2.70 | | | |
| 16(St) | ∞ | 11.10 | | | |
| 17 | −213.193 | 1.00 | 1.80400 | 46.6 | |
| 18 | 66.347 | 0.16 | | | |
| 19 | 25.041 | 4.50 | 1.58144 | 40.7 | |
| 20 | −50.688 | 0.20 | | | |
| 21 | 202.058 | 1.13 | 2.00069 | 25.5 | |
| 22 | 17.599 | 13.44 | 1.49700 | 81.6 | 0.5375 |
| 23 | −14.521 | 1.25 | 1.88300 | 40.8 | |
| 24 | −30.441 | 0.16 | | | |
| 25 | −86.737 | 6.54 | 1.61800 | 63.4 | |
| 26 | −25.346 | 57.00 | | | |
| 27 | ∞ | 1.74 | 1.51680 | 64.2 | |
| 28 | ∞ | | | | |

TABLE 6

Example 3

| Conditional Expression (1) | 0.047 |
|---|---|
| Conditional Expression (2) | 17.5 |
| Conditional Expression (3) | 0.028 |
| Conditional Expression (4) | 81.6 |
| Conditional Expression (5) | 0.05677 |
| Conditional Expression (6) | 1.32 |
| Conditional Expression (7) | 19.3 |

As is known from the foregoing data, the entire system of each of the wide angle lenses of Examples 1 to 3 is composed of fourteen lenses, and has a F-number of 4.95 and high optical performance with well corrected aberrations, including lateral chromatic aberration, while achieving a wide angle of 104° in total angle of view.

Next, one embodiment of the imaging apparatus according to the present invention will be described with reference to FIG. 7. FIG. 7 is a perspective view of an example camera to which the wide angle lens of an embodiment of the present invention is applied. The camera 10 shown in FIG. 7 is a single-lens reflex digital camera, and includes a camera body 11, a wide angle lens 12 installed on the front side of the camera body 11, and a flash emission device 13, a shutter button 14, and a mode dial 15 which are provided on the top of the camera body 11. Further, the camera body 10 includes therein an image sensor 16, such as a CCD (Charge Coupled Device) or a CMOS (Complementary Metal Oxide Semiconductor) that converts an optical image formed by the wide angle lens 12 to an electrical signal. The wide angle lens 12 is a lens system according to an embodiment of the present invention, and FIG. 7 shows only the most object side surface thereof. The image sensor 16 is disposed such that the imaging surface thereof corresponds to the image plane of the wide angle lens 12, and converts an optical image formed by the wide angle lens 12 to an electrical signal by capturing the image.

So far, the present invention has been described by way of embodiments and Examples, but it should be understood that the present invention is not limited to the embodiments and Examples described above, and various changes and modifications may be made. For example, values of radius of curvature, surface distance, refractive index, and Abbe number of each lens, and the like are not limited to those shown in each numerical example, and may take other values.

Further, in the embodiment of the imaging apparatus, the description has been made of a case in which the present invention is applied to a single-lens reflex digital camera with reference to the drawing, but the present invention is not limited to this application, and the invention is also applicable, for example, to video cameras, film cameras, motion picture cameras, and the like.

What is claimed is:

1. A wide angle lens consisting essentially of a front group, a stop, and a rear group having a positive refractive power, in order from the object side, wherein:
   a positive lens with a convex surface on the object side is disposed on the most object side in the front group;
   a negative meniscus lens with a convex surface on the object side is disposed second from the object side in the front group;
   the front group includes a cemented lens and, of the cemented lens included in the front group, a cemented lens located closest to the stop includes a first positive lens having a positive refractive power and a second negative lens having a negative refractive power; and
   the wide angle lens satisfies conditional expressions (1), (2), (5), and (6) given below:

$$0.038 < \theta gFf - 0.6415 + 0.001618 \times \nu df \quad (1)$$

$$\nu df < 19 \quad (2)$$

$$0.02 < Ndp - Ndn < 0.25 \quad (5)$$

$$0.2 < \nu dp - \nu dn < 5 \quad (6)$$

where
   θgFf: partial dispersion ratio of the negative meniscus lens between the g-line and the F-line,
   νdf: Abbe number of the negative meniscus lens with respect to the d-line,
   Ndp: refractive index of the first positive lens with respect to the d-line,
   Ndn: refractive index of the second negative lens with respect to the d-line,
   νdp: Abbe number of the first positive lens with respect to the d-line, and
   νdn: Abbe number of the second negative lens with respect to the d-line.

2. The wide angle lens as claimed in claim 1, wherein:
   the rear group includes one positive lens having a biconvex shape; and
   the wide angle lens satisfies conditional expressions (3) and (4) given below:

$$0.020 < \theta gFr - 0.6415 + 0.001618 \times \nu dr \quad (3)$$

$$\nu dr > 75 \quad (4)$$

where
- θgFr: partial dispersion ratio of the positive lens having a biconvex shape between the g-line and the F-line, and
- νdr: Abbe number of the positive lens having a biconvex shape with respect to the d-line.

3. The wide angle lens as claimed in claim 1, wherein the wide angle lens satisfies a conditional expression (7) given below:

$$\nu dp < 33 \tag{7}$$

4. The wide angle lens as claimed in claim 1, wherein, of the cemented lens included in the front group, the cemented lens located closest to the stop has a configuration in which a positive lens and a negative lens are cemented in this order from the object side.

5. The wide angle lens as claimed in claim 1, wherein, of the cemented lens included in the front group, the cemented lens located closest to the stop has a configuration in which a positive lens and a negative lens are cemented and the cemented surface of the positive lens and the negative lens has a concave shape on the object side.

6. The wide angle lens as claimed in claim 1, wherein the wide angle lens has a total angle of view of 80 degrees or more.

7. The wide angle lens as claimed in claim 1, wherein the wide angle lens satisfies conditional expressions (5') and (6') given below:

$$0.03 < Ndp - Ndn < 0.12 \tag{5'}$$

$$0.7 < \nu dp - \nu dn < 2.5 \tag{6'}$$

8. The wide angle lens as claimed in claim 1, wherein the wide angle lens satisfies a conditional expression (7') given below:

$$\nu dp < 30 \tag{7'}$$

9. The wide angle lens as claimed in claim 1, wherein the wide angle lens satisfies conditional expressions (5") and (6") given below:

$$0.03 < Ndp - Ndn < 0.07 \tag{5"}$$

$$0.7 < \nu dp - \nu dn < 1.5 \tag{6"}$$

10. The wide angle lens as claimed in claim 1, wherein the wide angle lens satisfies a conditional expression (7") given below:

$$\nu dp < 27 \tag{7"}$$

11. An imaging apparatus equipped with the wide angle lens as claimed in claim 1.

\* \* \* \* \*